(12) United States Patent
Calabrese

(10) Patent No.: US 9,565,843 B2
(45) Date of Patent: Feb. 14, 2017

(54) FISHING DEVICE AND METHOD

(71) Applicant: Michael Calabrese, Pompano Beach, FL (US)

(72) Inventor: Michael Calabrese, Pompano Beach, FL (US)

(*) Notice: Subject to any disclaimer, the term of this patent is extended or adjusted under 35 U.S.C. 154(b) by 155 days.

(21) Appl. No.: 14/464,903

(22) Filed: Aug. 21, 2014

(65) Prior Publication Data
US 2015/0068101 A1 Mar. 12, 2015

Related U.S. Application Data
(60) Provisional application No. 61/960,081, filed on Sep. 10, 2013.

(51) Int. Cl.
*A01K 85/00* (2006.01)
*A01K 85/18* (2006.01)

(52) U.S. Cl.
CPC .............. *A01K 85/005* (2013.01); *A01K 85/18* (2013.01)

(58) Field of Classification Search
CPC ...... A01K 85/14; A01K 85/005; A01K 85/00; A01K 85/18
USPC ........... 43/42.11, 42.15, 42.17, 42.18, 42.24, 43/42.45
See application file for complete search history.

(56) References Cited

U.S. PATENT DOCUMENTS

| | | | | |
|---|---|---|---|---|
| 857,593 A * | 6/1907 | Brown | ............... | A63H 3/04 43/42.15 |
| 2,556,683 A * | 6/1951 | Deitz | ............... | A01K 85/16 43/42.06 |
| 2,817,921 A * | 12/1957 | Czesnocha | ............ | A01K 85/14 24/709.8 |
| 3,081,573 A * | 3/1963 | Mutti | ............... | A01K 85/12 43/42.24 |
| 3,229,407 A * | 1/1966 | Quyle | ............... | A01K 85/14 43/42.18 |
| 5,918,406 A * | 7/1999 | Wilson | ............... | A01K 85/00 43/42.15 |
| 6,233,864 B1 * | 5/2001 | Mathews, Jr. | ......... | A01K 85/01 43/42.02 |
| 6,769,950 B1 * | 8/2004 | Suciu | ............... | A63H 33/40 116/173 |
| 6,910,295 B2 * | 6/2005 | Nakahashi | ............ | A01K 85/18 43/42.15 |
| 7,216,456 B2 * | 5/2007 | Kaariainen | ............ | A01K 91/06 43/42.23 |
| 8,021,732 B2 * | 9/2011 | Hegemier | ............ | A01K 85/01 428/40.1 |

(Continued)

*Primary Examiner* — Cassandra Davis
(74) *Attorney, Agent, or Firm* — Johnson & Martin, P.A.; James David Johnson

(57) ABSTRACT

A fishing device provided is configurable as a teaser that can simulate a live fish. A hookless teaser provided is configurable in various shapes and sizes to effectively attract a desired fish. More particularly, a fishing device is provided including a first portion, a second portion, and a flexible portion. The flexible portion may be received by and operatively attached to the first and second portions. The flexible portion may facilitate reorienting the second portion with relation the first portion to simulate swimming. The first portion may be configured to simulate a head of a fish and the second portion may be configured to simulate a tail of the fish. A loop near the central second portion end may interact with water to reorient the second portion. A method is provided for using the fishing device.

12 Claims, 3 Drawing Sheets

(56) References Cited

U.S. PATENT DOCUMENTS

| | | | | |
|---|---|---|---|---|
| 8,950,106 B2* | 2/2015 | Kaariainen | ............ | A01K 85/14 |
| | | | | 43/42.15 |
| 2006/0059767 A1* | 3/2006 | Tsai | ....................... | A01K 85/16 |
| | | | | 43/42.15 |
| 2009/0307959 A1* | 12/2009 | Hughes | .................. | A01K 85/18 |
| | | | | 43/42.15 |

* cited by examiner

FISHING DEVICE AND METHOD

CROSS-REFERENCE TO RELATED APPLICATIONS

This application is a nonprovisional application of and claims priority from U.S. provisional patent application Ser. No. 61/960,081 filed on Sep. 10, 2013. The foregoing application is incorporated in its entirety herein by reference.

FIELD OF THE INVENTION

The present invention relates to a fishing device. More particularly, the present invention relates to fishing devices including fishing teasers.

BACKGROUND

Fishing has long been a popular sport and source of food for people. Typically, the fisherman may use live bait attached to a line with the hook to catch a fish. However, live bait can be costly to procure and can expire before being used to fish. To counter this disadvantage, the fishing industry developed artificial lures to reduce dependency on live bait. Use of artificial lures and other devices advantageously reduces overharvesting of the species, a practice that could otherwise starve out larger and more desirous game fish.

Unfortunately, artificial lures and other devices lack the natural movement and appearance of live bait. This may disadvantageously reduce the effectiveness of the artificial lures and other devices in attracting a desired fish. Efforts have been made to mitigate this disadvantage, such as providing multiple teaser lures or simulated fish in a daisy chain to mimic a possible school of baitfish. However, such efforts still fail to produce an artificial fish that is virtually indistinguishable from live baitfish to a desired fish.

What is needed is a fishing device that resembles a live fish. What is needed is a fishing teaser capable of moving such to simulate a live fish. What is needed is a hookless teaser configurable various shapes and sizes to effectively attract a desired fish. What is needed is a lifelike teaser includable in a dredge to facilitate fishing.

SUMMARY

According to an embodiment of the present invention, a hookless teaser may be provided constructed using rubber, vinyl, and other materials. The teaser of the present invention may move as it travels through water, creating a swimming effect. The present invention may advantageously allow a user to fish a dredge, which may be an umbrella style rig that includes multiple dozens of baitfish, whether natural or artificial.

The present invention provides a fishing device that resembles a live fish. The present invention provides a fishing teaser capable of moving such to simulate a live fish. The present invention provides a hookless teaser configurable in various shapes and sizes to effectively attract a desired fish. The present invention provides a lifelike teaser includable in a dredge to facilitate fishing.

According to an embodiment of the present invention, a fishing device is provided including a first portion, a second portion, and a flexible portion. The first portion includes a distal first portion end and a central first portion end. The second portion includes a distal second portion end and a central second portion end. The flexible portion includes a first flexible portion end and a second flexible portion end. The first flexible portion end may be received by and operatively attached to the central first portion end of the first portion. The second flexible portion end may be received by and operatively attached to the central second portion end of the second portion. The flexible portion may facilitate reorienting the second portion with relation to the first portion to simulate swimming. The first portion may be configured to simulate a head of a fish and the second portion may be configured to simulate a tail of the fish.

In another aspect, a grommet may be included at the distal first portion end of the first portion, wherein the device is towable from the grommet.

In another aspect, the second portion may include a loop near the central second portion end that may interact with water to reorient the second portion.

In another aspect, the second portion may include a fringe at the central second portion end that may interact with water to reorient the second portion.

In another aspect, the first portion may include at least two first portion sheets. The second portion may include at least two second portion sheets. The first flexible portion end of the flexible portion is includable between the first portion sheets and the second flexible portion end of the flexible portion is includable between the second portion sheets.

In another aspect, the first portion may further include a first portion sheet that is split at the central first portion end. The second portion may include a second portion sheet that is split at the central second portion end. The first flexible portion end of the flexible portion is receivable by the central first portion end of the first portion that is split. The second flexible portion end of the flexible portion is receivable by the central second portion end of the second portion that is split.

In another aspect, the flexible portion may be attached to the first portion and the second portion via stitching.

In another aspect, the flexible portion may be constructed using vinyl.

In another aspect, the first portion and the second portion may be constructed using rubber.

In another aspect, the rubber may include neoprene rubber.

According to an embodiment of the present invention, a fishing device is provided including a first portion, a second portion, and a flexible portion. The first portion may include a distal first portion end, a central first portion end, and a grommet located at the distal first portion end. The second portion may include a distal second portion end and a central second portion end. The flexible portion may include a first flexible portion end and a second flexible portion end. The first flexible portion end may be received by and operatively attached to the central first portion end of the first portion. The second flexible portion end may be received by and operatively attached to the central second portion end of the second portion. The device may additionally include a loop positioned near the central second portion end of the second portion to interact with water to reorient the second portion in relation to the first portion to simulate swimming as facilitated by the flexible portion. The device may be towable from the grommet.

In another aspect, the first portion may include at least two first portion sheets and the second portion may include at least two second portion sheets. The first flexible portion end of the flexible portion is includable between the first portion sheets. The second flexible portion end of the flexible portion is includable between the second portion sheets.

In another aspect, the first portion may include a first portion sheet that is split at the central first portion end. The second portion may include a second portion sheet that is split at the central second portion end. The first flexible portion end of the flexible portion is receivable by the central first portion end of the first portion that is split. The second flexible portion end of the flexible portion is receivable by the central second portion end of the second portion that is split.

In another aspect, the flexible portion may be attached to the first portion and the second portion via stitching.

According to an embodiment of the present invention, a method is provided for using a fishing device including a first portion, second portion, and flexible portion to simulate swimming fish. The method may include (a) attaching a line to a distal first portion end of the first portion, the first portion further including a central first portion end operatively attached to a first flexible end of the flexible portion; (b) towing the first portion through water; (c) causing the second portion to reorient with relation to the first portion, a central second portion end of the second portion being operatively attached to a second flexible end of the flexible portion. Step (c) may further include: (i) receiving the water by a loop located near the central second portion end of the second portion, (ii) causing the loop to catch the water and reorient the second portion in a first direction, and (iii) causing the loop the dump the water and reorient the second portion in a second direction. The flexible portion may facilitate reorienting the second portion with relation to the first portion to simulate swimming.

In another aspect, the first portion may further include a grommet at the distal first portion end. The line is attachable to the grommet.

In another aspect, the first portion may include at least two first portion sheets and the second portion may include at least two second portion sheets. The first flexible portion end of the flexible portion is includable between the first portion sheets. The second flexible portion end of the flexible portion is includable between the second portion sheets.

In another aspect, the first portion may include a first portion sheet that is split at the central first portion end. The second portion may include a second portion sheet that is split at the central second portion end. The first flexible portion end of the flexible portion is receivable by the central first portion end of the first portion that is split. The second flexible portion end of the flexible portion is receivable by the central second portion end of the second portion that is split.

In another aspect, the flexible portion may be attached to the first portion and the second portion via stitching.

In another aspect, the first portion is configured to simulate a head of a fish and the second portion is configured to simulate a tail of the fish.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
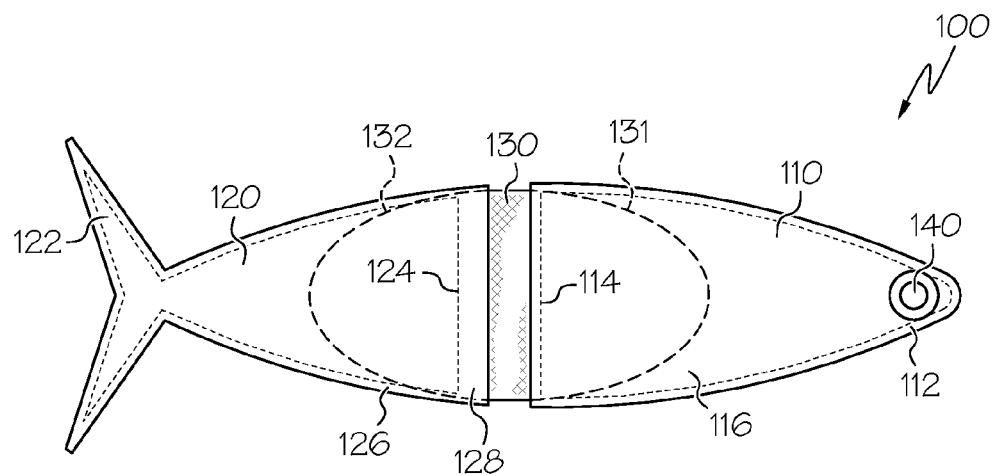
FIG. 1 is a top plan view of a fishing device, according to an embodiment of the present invention.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. In addition, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention relates to a fishing device. More particularly, the invention relates to a hookless "teaser" to be used in fishing applications and may be shaped to resemble a fish. The invention may also be constructed using a variety of materials, such as by including rubber sections with a piece of vinyl affixed between that causes the fish to "swim." The invention may be used to effectively and efficiently fish a dredge (umbrella style rig including multiple dozens of baitfish, whether natural or artificial) using artificial fish to reduce effort and financial burden.

The invention may include multiple pieces to construct an artificial fish, which may include an approximately $1/16$ inch, $1/32$ inch, or otherwise sized neoprene rubber section. The artificial fish used with the invention may be adhered together with a piece of vinyl located internally to create a soft spot, which enables proper movement of the fish. On the back portion of the fish (tail), a $1/32$ piece of neoprene rubber may be folded and stitched to cause water to "catch and dump" and create a swimming motion, without limitation. In one embodiment, a grommet may be affixed to the front of the fish to create a point of attachment.

Figure 2:
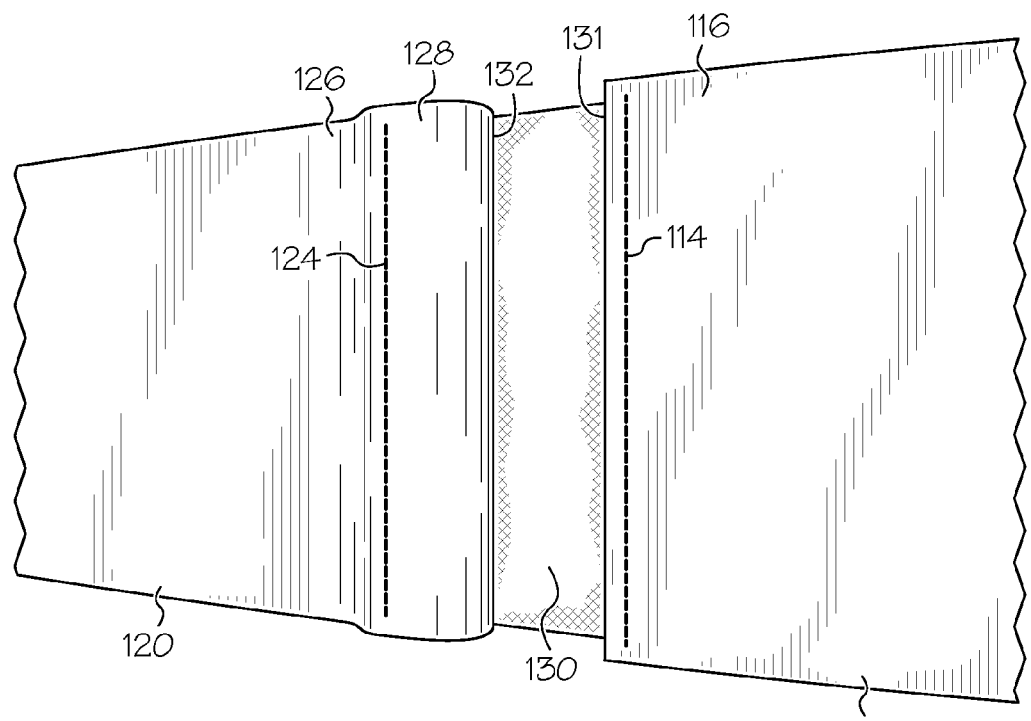
FIG. 2 is a partial front elevation view of the fishing device, according to an embodiment of the present invention.
Figure 3:
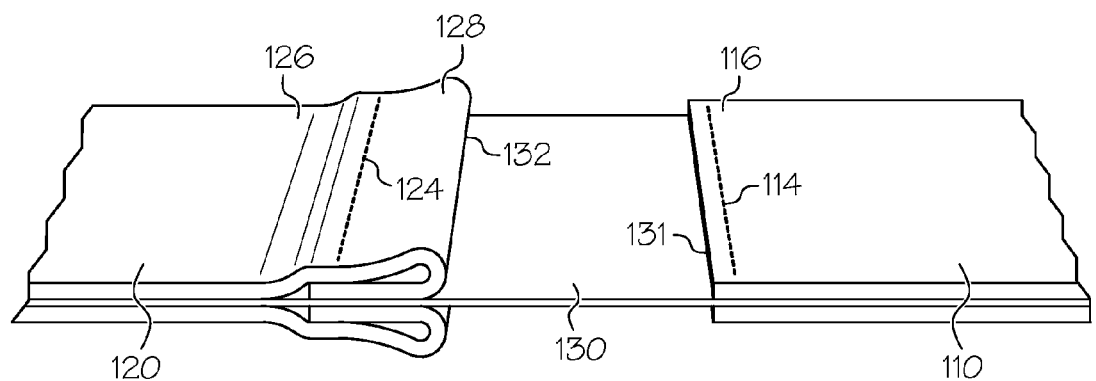
FIG. 3 is a partial perspective view of the fishing device of FIG. 2.

The first portion 110 will now be discussed in greater detail along with FIGS. 1-3. The first portion 110 may be constructed using virtually any material, for example, neoprene rubber. The first portion 110 may be constructed using one or more first portion sheets, which may be attached to one another. The sheets may be attached via stitching, adhesive, welding, and other attachment techniques that would be appreciated by persons skilled in the art. Alternatively, the first portion 110 may be a single sheet split at one of its ends.

The first portion 110 may be designed to look like a head of a fish. The first portion 110 may include a distal first portion end 112 and a central first portion end 116. A grommet 140 may be included at the distal first portion end 112 of the first portion 110. The grommet 140 may be located at such a position to resemble an eye of a fish. A fishing line or other connective structure may be temporarily attached to the grommet 140. The device 100 of the present invention may be towed by the fishing line or other connective structure attached to the grommet 140.

The first portion 110 may also include a central first portion end 116, which may attach to a first flexible portion end 131 of a flexible portion 130. The flexible portion 130 will be discussed in greater detail below. The connection between the first portion 110 and a flexible portion 130 may be made via stitching, adhesive, welding, or other attachment techniques that would be appreciated by persons skilled in the art. In an embodiment of the first portion 110 having at least two first portion sheets, the flexible portion 130 may be located between each of the sheets of the first portion 110 near the central first portion end 116. The sheets of the first portion 110 and the first flexible portion end 131 of the flexible portion 130 may be connected via stitching 114 or another connection technique.

The second portion 120 will now be discussed in greater detail along with FIGS. 1-3. The second portion 120 may be constructed using virtually any material, for example, neoprene rubber. The second portion 120 may be constructed using one or more second portion sheets, which may be attached to one another. The sheets may be attached via stitching, adhesive, welding, and other attachment techniques that would be appreciated by persons skilled in the art. Alternatively, the second portion 120 may be a single sheet split at one of its ends.

The second portion 120 may be designed to look like a tail of a fish. The second portion 120 may include a distal second portion end 122 and a central second portion end 126. A tail-resembling structure may be included at the distal second portion end 122 of the second portion 120. The second portion 120 may move while the device 100 is towed by a fishing line or other connective structure attached to the first portion 110 to simulate swimming.

The second portion 120 may also include a central second portion end 126, which may attach to a second flexible portion end 132 of a flexible portion 130. The flexible portion 130 will be discussed in greater detail below. The connection between the second portion 120 and a flexible portion 130 may be made via stitching, adhesive, welding, or other attachment techniques that would be appreciated by persons skilled in the art. In an embodiment of the second portion 120 having at least two second portion sheets, the flexible portion 130 may be located between each of the sheets of second portion 120 near the central second portion end 126. The central second portion end 126 of the second portion 120 may be folded upon itself to create a loop 128. The sheets of the second portion 120, including any created loops 128, and the second flexible portion end 132 of the flexible portion 130 may be connected via stitching 124 or another connection technique. Material may be removed from the second portion 120 near its upper and lower edges at the loop 128. Removal of this material may provide a loop 128 that is narrower than the adjacent material of the second portion 120 nearest the flexible portion 130, which may advantageously reduce a drag created by the device as it is towed through water or another fluid.

The flexible portion 130 will now be discussed in greater detail along with FIGS. 1-3. The flexible portion 130 may be constructed using virtually any flexible material, for example, vinyl. The flexible portion 130 may be designed to look like a middle portion of the fish. The flexible portion 130 may include a first flexible portion end 131 and a second flexible portion end 132, each of which are positionable and attachable between the first portion 110 and second portion 120, respectively. The flexible portion 130 may facilitate movement of the first portion 110 and second portion 120 while the device 100 is towed by a fishing line or other connective structure attached to the first portion 110 to simulate swimming.

The connection between the first flexible portion end 131 of the flexible portion 130 and the central first portion end 116 of the first portion 110 may be made via stitching 114, adhesive, welding, or other attachment techniques that would be appreciated by persons of skill in the art. Similarly, the second flexible portion end 132 of the flexible portion 130 and the central second portion end 126 of the second portion 120 may be made via similar attachment techniques, including stitching 124. In an embodiment of the first portion 110 and/or second portion 120 having two sheets, the flexible portion 130 may be located between each of the sheets of the first portion 110 and/or second portion 120 near the central portion ends 116, 126 of the respective portions 110, 120. The central second portion end 126 of the second portion 120 may be folded upon itself to create a loop 128, allowing the second portion 120 and any created loops 128 to be connected to the second flexible portion end 132 of the flexible portion 130.

Figure 4:
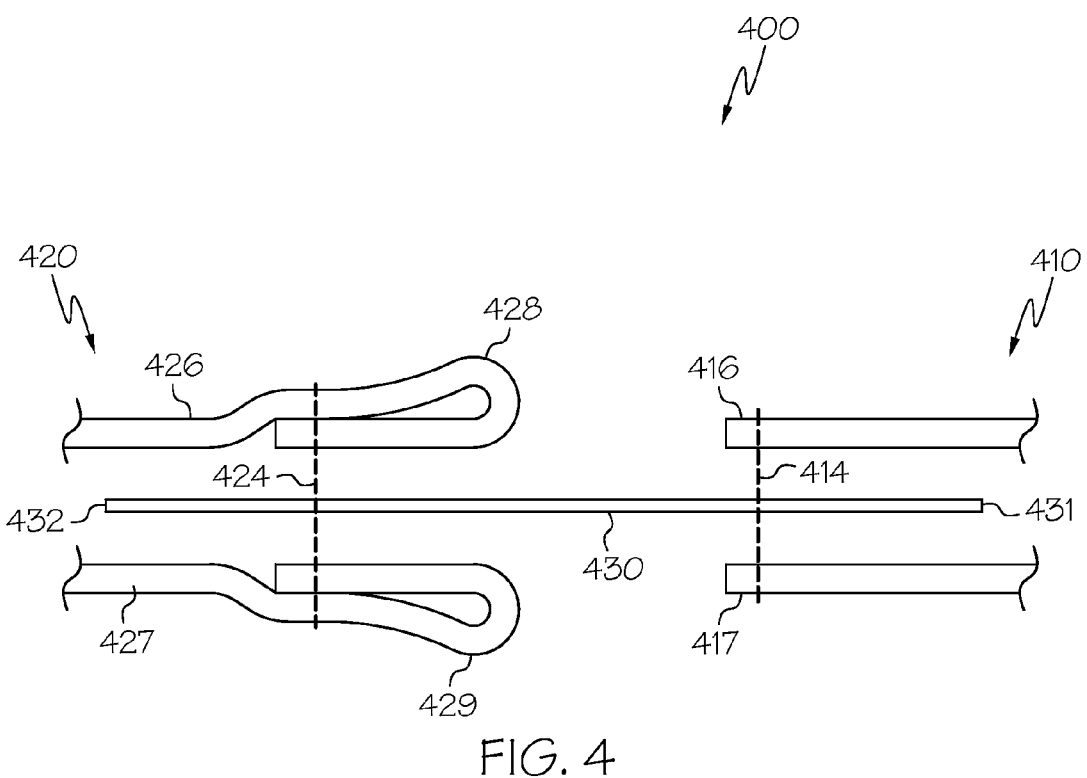
FIG. 4 is an exploded view of the first portion, second portion, and flexible portion, according to an embodiment of the present invention.

Referring now to exploded diagram 400 of FIG. 4, an illustrative connection between the first portion 410, second portion 420, and flexible portion 430 will be discussed. In this example, the first portion 410 may include two sheets, showing a top sheet central end 416 and a bottom sheet central end 417. Similarly, in this example, the second portion 420 may include two sheets, showing a 426 and the bottom sheet central end 427. The flexible portion 430 may include a first end 431 locatable between the sheets at the central end 416, 417 of the first portion 410. The flexible portion 430 may also include the second end 432 locatable between the sheets at the central end 426, 427 of the second portion 420.

The central ends 426, 427 of the second portion 420 may include loops 428, 429. Loop 428 may be included by the top sheet and may point outwardly from the flexible portion 430. Similarly, loop 429 may be included by the bottom sheet and may point outwardly from the flexible portion 430.

Stitching 414 may connect the central end 416, 417 of the sheets of the first portion and the first end 431 of the flexible portion 430. Additionally, stitching 424 may connect the central end 426, 427 of the sheets of the second portion 420 and the second end 432 of the flexible portion 430, with the stitching passing through the top sheet central end 426 in bottom sheet central end 427 such to create top sheet loop 428 and bottom sheet loop 429, respectively.

Figure 5:
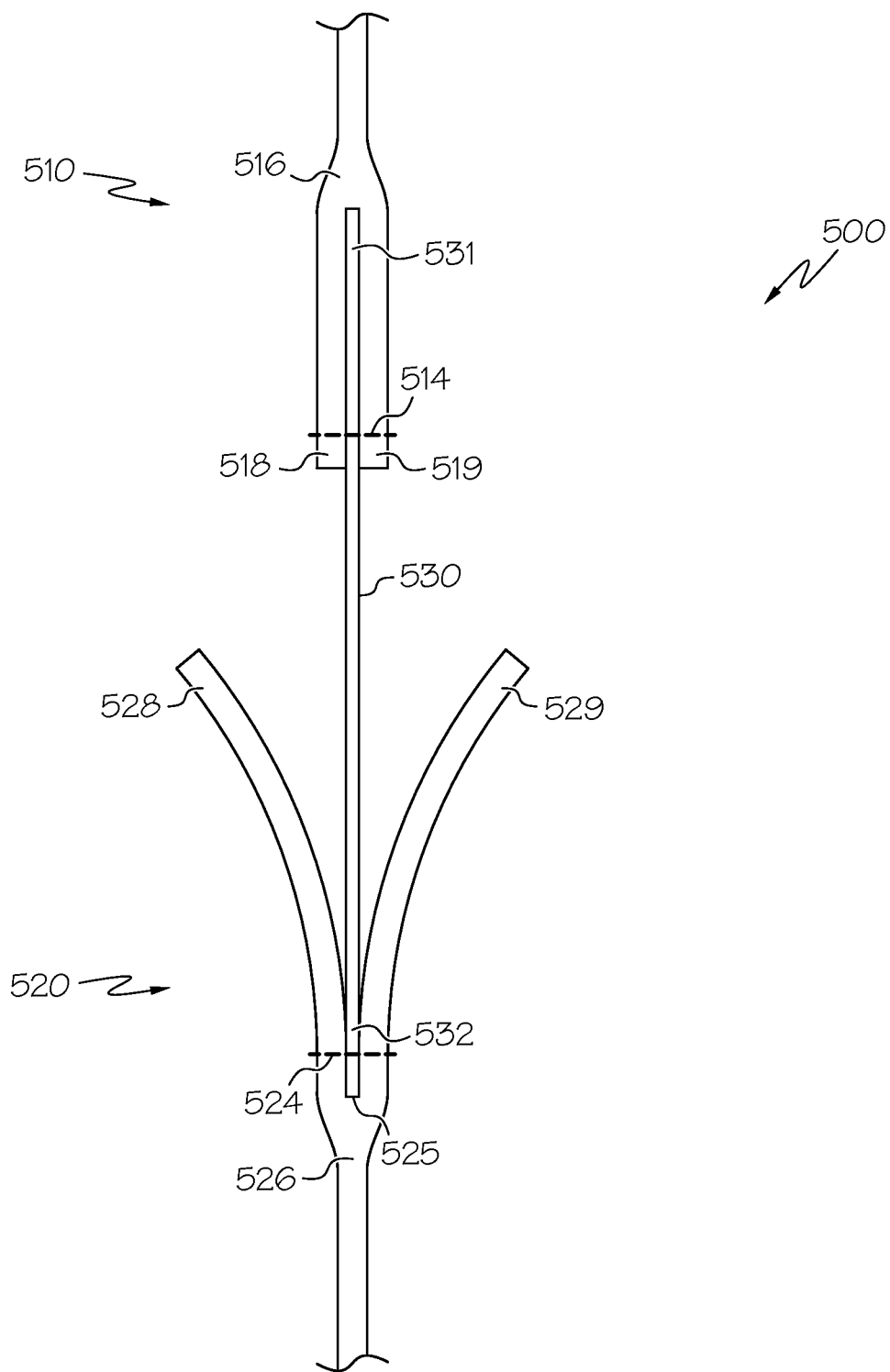
FIG. 5 is a partial side elevation view of an alternative embodiment of the present invention.

Referring now to diagram 500 of FIG. 5, an alternative connection between the first portion 510, second portion 520, and flexible portion 530 will be discussed. In this example, the first portion 510 may include a single sheet that is split to create fringes 518, 519 at the first portion central end 516. Similarly, in this example, the second portion 520 may include a single sheet that is split to create fringes 528, 529 at the second portion central end 526. The flexible portion 530 may include a first end 531 locatable between the fringes 518, 519 of the first portion central end 516. The flexible portion 530 may also include the second end 532 locatable between the fringes 528, 529 of the second portion central end 526.

Stitching 514 may connect the central end 516, including fringes 518 and 519, of the first portion 510 and the first end 531 of the flexible portion 530. Additionally, stitching 524 may connect the central end 526 of the second portion 520 and the second end 532 of the flexible portion 530. The stitching may pass through the fringes 528, 529 of the central end 526 and near the splitting point 525 such to create an elongated length of material of the fringes 528, 529 extending somewhat outwardly from the flexible portion 530. The elongated lengths may be used to catch and dump water.

In operation, the first portion and a second portion may be connected to the flexible portion such that the device may move when traveling through water and simulate the swimming effect. The second portion may include loops, fringes, or other features that causes water to "catch and dump," simulating the swimming motion of a fish. The swimming motion may be created as the angular relationship between the first portion and the second portion changes as the device passes through water. The motion provided by the device may sufficiently trick game fish and other desired fish into believing the device is a live baitfish.

Water is used throughout this disclosure to broadly describe any liquid or other fluid through which the device may pass. Examples of water, as applied to this disclosure, include fresh water, salt water, seawater, solutions including water, other liquids, other fluids, and other substances that would be apparent to a person of skill in the art, without limitation. Additionally, the term "catch" should be read as interacting with a passing fluid such to be moved by that fluid in a first direction. Similarly, the term "dump" should be read as interacting with a passing fluid such to be moved by that fluid in a second direction. As water may catch and dump on a component of the device, for example a loop or fringe, the second portion may fluctuate movement between the first direction and second direction to simulate a swimming effect.

An illustrative embodiment of the device will now be discussed, without limitation. In this embodiment, the device may be approximately 12 inches in length and 3 inches in height. The first portion may include two sheets of approximately $\frac{1}{32}$ inch thick rubber sheets, for example, neoprene rubber sheets. The second portion may also include two sheets of approximately $\frac{1}{32}$ inch thick rubber sheets, for example, neoprene rubber sheets. The sheets of the first portion may be stitched together such that the second end of the first portion substantially envelops the first end of the flexible portion. Additionally, the sheets and the second portion may be stitched together such that the second end of the second portion substantially envelops the second end of the flexible portion. The flexible portion may be situated within the first portion and the second portion such that approximately ¾ inch of vinyl provides the desired flexibility. In additional embodiments, the device may be provided in a small size of about 11 inch by about 1.75 inch, a large size of about 14 inch by about 2.75 inch, an extra large size of about 20 inch by about 4.5 inch, or virtually any other size. These embodiments of particular sizes are provided in the interest of clearly providing examples of the device, and are not intended to limit its possible dimensions in any way. Skilled artisans will appreciate additional thicknesses and dimensions, without limitation.

An illustrative embodiment of the device will now be discussed, without limitation. In this embodiment, the device may be approximately 12 inches in length and 1.5 inch in height. The first portion may include two sheets of approximately 1/32 inch thick rubber sheets, for example, neoprene rubber sheets. The second portion may also include two sheets of approximately 1/32 inch thick rubber sheets, for example, neoprene rubber sheets. The sheets of the first portion may be stitched together such that the second end of the first portion substantially envelops the first end of the flexible portion. Additionally, the sheets and the second portion may be stitched together such that the second end of the second portion substantially envelops the second end of the flexible portion. The flexible portion may be situated within the first portion and the second portion such that approximately ½ inch of vinyl provides the desired flexibility. Skilled artisans will appreciate additional thicknesses and dimensions, without limitation.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A fishing device comprising:
    a first portion comprising a central first portion end and a distal first portion end;
    a second portion comprising a central second portion end and a distal second portion end; and
    a flexible portion comprising a first flexible portion end and a second flexible portion end, the first flexible portion end being received by and operatively attached to the central first portion end of the first portion, and the second flexible portion end being received by and operatively attached to the central second portion end of the second portion;
    wherein the flexible portion facilitates reorienting the second portion with relation to the first portion to simulate swimming;
    wherein the first portion is configured to simulate a head of a fish, and wherein the second portion is configured to simulate a tail of the fish;
    wherein the first portion further comprises at least two first portion sheets;
    wherein the second portion comprises at least two second portion sheets;
    wherein the first flexible portion end of the flexible portion is includable between the first portion sheets;
    wherein the second flexible portion end of the flexible portion is includable between the second portion sheets; and
    wherein the second portion further comprises a loop or fringe near the central second portion end, the loop or fringe interacting with water to reorient the second portion.

2. The device of claim 1, further comprising a grommet at the distal first portion end of the first portion, wherein the device is towable from the grommet.

3. The device of claim 1, wherein the flexible portion is attached to the first portion and the second portion via stitching.

4. The device of claim 1, wherein the flexible portion is constructed using vinyl.

5. The device of claim 1, wherein the first portion and the second portion are constructed of rubber.

6. The device of claim 5, wherein the rubber comprises neoprene rubber.

7. A fishing device comprising:
    a first portion comprising a central first portion end, a distal first portion end, and a grommet located at the distal first portion end;
    a second portion comprising a central second portion end and a distal second portion end;
    a flexible portion comprising a first flexible portion end and a second flexible portion end, the first flexible portion end being received by and operatively attached to the central first portion end of the first portion, and the second flexible portion end being received by and operatively attached to the central second portion end of the second portion; and
    a loop positioned near the central second portion end of the second portion to interact with water to reorient the second portion in relation to the first portion to simulate swimming;
    wherein the device is towable from the grommet;
    wherein the first portion comprises at least two first portion sheets;
    wherein the second portion comprises at least two second portion sheets;
    wherein the first flexible portion end of the flexible portion is includable between the first portion sheets; and
    wherein the second flexible portion end of the flexible portion is includable between the second portion sheets.

8. The device of claim 7, wherein the device is a teaser.

9. A method of using a fishing device comprising a first portion, a second portion, and a flexible portion to simulate a swimming fish, the method comprising:
    (a) attaching a line to a distal first portion end of the first portion, the first portion further comprising a central first portion end operatively attached to a first flexible end of the flexible portion;
    (b) towing the first portion through water; and
    (c) causing the second portion to reorient with relation to the first portion, a central second portion end of the second portion being operatively attached to a second flexible end of the flexible portion, this step further comprising:
        (i) receiving the water by a loop located near the central second portion end of the second portion, (ii) causing the loop to catch the water and reorient the second portion in a first direction, and
(iii) causing the loop to dump the water and reorient the second portion in a second direction;

wherein the flexible portion facilitates reorienting the second portion with relation to the first portion to simulate swimming;

wherein the first portion further comprises at least two first portion sheets;

wherein the second portion comprises at least two second portion sheets;

wherein the first flexible portion end of the flexible portion is includable between the first portion sheets; and wherein the second flexible portion end of the flexible portion is includable between the second portion sheets.

10. The method of claim 9, the first portion further comprising a grommet at the distal first portion end, wherein the line is attachable to the grommet.

11. The method of claim 9, wherein the flexible portion is attached to the first portion and the second portion via stitching.

12. The method of claim 9, wherein the first portion is configured to simulate a head of a fish and the second portion is configured to simulate a tail of the fish.

* * * * *